United States Patent
Hecht et al.

(10) Patent No.: US 7,026,606 B2
(45) Date of Patent: Apr. 11, 2006

(54) AUTO-FOCUS SYSTEM WITH 2-D OR 3-D COMPENSATION

(75) Inventors: Kurt Hecht, Hartsville, PA (US); Thomas J. Brobst, Allentown, PA (US); Ronald C. Wurz, Perkasie, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 299 days.

(21) Appl. No.: 10/276,573

(22) PCT Filed: May 16, 2001

(86) PCT No.: PCT/US01/15889

§ 371 (c)(1), (2), (4) Date: Apr. 22, 2003

(87) PCT Pub. No.: WO01/88588

PCT Pub. Date: Nov. 22, 2001

(65) Prior Publication Data

US 2004/0124347 A1    Jul. 1, 2004

Related U.S. Application Data

(60) Provisional application No. 60/204,610, filed on May 16, 2000.

(51) Int. Cl.
*H01J 3/14* (2006.01)

(52) U.S. Cl. .............. 250/234; 250/201.2; 235/462.24; 235/462.43

(58) Field of Classification Search ............. 250/201.2, 250/201.3, 208.1, 234, 223 R; 235/440, 235/462.22–462.24, 462.41, 462.32, 462.43
See application file for complete search history.

(56) References Cited

U.S. PATENT DOCUMENTS

| 3,854,035 | A | * | 12/1974 | Tyler et al. | .................. | 235/471 |
|---|---|---|---|---|---|---|
| 3,873,812 | A | * | 3/1975 | Stein et al. | .................. | 235/471 |
| 3,902,047 | A | * | 8/1975 | Tyler et al. | .................. | 235/471 |
| 5,453,784 | A | * | 9/1995 | Krishnan et al. | ........... | 348/348 |

(Continued)

FOREIGN PATENT DOCUMENTS

EP        1087325  A2    3/2001

(Continued)

*Primary Examiner*—Thanh X. Luu
*Assistant Examiner*—Stephen Yam
(74) *Attorney, Agent, or Firm*—Volpe and Koenig, P.C.

(57) ABSTRACT

An optical scanning apparatus and method for scanning a surface of an object is provided. The scanner has an image sensor having a sensor plane and an image data output. An optics system defines an optical path having an axis and a first end whereat a scan object surface is locatable for scanning and a second end at the sensing plane. Preferably, the optics system includes a lens subsystem and a movable mirror for adjusting the length of the optical path. A linear actuator is coupled to the mirror such that movement of the mirror adjusts the focus of an optical image on the image sensor. A linear actuator is also operatively coupled to the image sensor to control the orientation of the plane of the image sensor relative to the optical path axis. When a scan object surface is located at the first end of the optical path at an orientation skewed from a plane orthogonal with the optical path axis at the first path end, the linear actuator orients the sensor plane to a corresponding skewed orientation relative to a plane orthogonal with the optical path axis at the second path end.

15 Claims, 4 Drawing Sheets

U.S. PATENT DOCUMENTS

| | | | | |
|---|---|---|---|---|
| 5,523,552 A | * | 6/1996 | Shellhammer et al. | 235/462.09 |
| 5,796,089 A | * | 8/1998 | Marom | 235/462.24 |
| 5,872,354 A | | 2/1999 | Hanson | 235/472.01 |
| 6,072,529 A | * | 6/2000 | Mutze | 348/351 |
| 6,075,242 A | * | 6/2000 | Tsai et al. | 250/234 |
| 6,729,544 B1 | * | 5/2004 | Navon | 235/462.14 |

FOREIGN PATENT DOCUMENTS

| WO | WO9302428 | 2/1993 |
|---|---|---|

* cited by examiner

AUTO-FOCUS SYSTEM WITH 2-D OR 3-D COMPENSATION

The present invention relates to an automatic focusing optical scanning apparatus and method. More particularly, this invention relates to an automatic focusing apparatus and method with 2-D or 3-D compensation to scan coded symbologies on a package regardless of the packages orientation on a transporting conveyor.

BACKGROUND

In order to achieve processing automation of packages, it is desirable to be able to scan coded symbologies of a package where the package is being transported along a surface, such as a conveyor surface. The need for efficiency in handling a large volume of packages has become more apparent with increases in interstate shipping due to Internet commerce.

Prior known optical scanning systems utilize an optical sensor to detect the coded symbologies located on the package. In general, prior art systems adjust the position of the lens system relative to the image sensor to focus the image of the coded symbology on the image sensor. Even if the scanning system locates a coded symbology on a package, if the package is skewed with respect to the scanning system, the image sensor may be unable to focus on the entire coded symbology. This can result in higher costs for processing.

It is desirable to provide a fast, accurate and cost efficient system to automatically focus on coded symbologies of a package traveling on a conveyor.

SUMMARY OF THE INVENTION

An optical scanning apparatus and method for scanning a surface of an object is provided. The scanner has an image sensor having a sensor plane and an image data output. An optics system defines an optical path having an axis and a first end whereat a scan object surface is locatable for scanning and a second end at the sensing plane. The optics system includes a lens subsystem and may include a movable mirror for adjusting the length of the optical path. A linear actuator is coupled to the mirror such that movement of the mirror adjusts the focus of an optical image on the image sensor.

Another linear actuator is also operatively coupled to the image sensor to control the orientation of the plane of the image sensor relative to the optical path axis. When a scan object surface is located at the first end of the optical path at an orientation skewed from a plane orthogonal with the optical path axis at the first path end, the linear actuator orients the sensor plane to a corresponding skewed orientation relative to a plane orthogonal with the optical path axis at the second path end.

Preferably, the sensor linear actuator pivots the image sensor plane about a central axis of the image sensor plane and the optical path is configured such that the optical path axis passes through the central axis.

Alternatively, two linear actuators are coupled to the optical sensor for working cooperatively together to pivot the image sensor plane along a vertical image axis and a horizontal image axis. Preferably, one of the pivot axes of the image sensor plane is a central axis of the image sensor plane and the optical path is configured such that the optical path axis passes through the central axis.

Preferably, the drive system of each linear actuator is coupled to a position feedback mechanism which outputs data to assist in the control of the linear actuators. The optical sensor preferably is a CCD/CMOS area or linear image sensor.

Other objects and advantages will be apparent to a skilled artesian from the following description of presently preferred embodiments.

DETAILED DESCRIPTION OF THE PREFERRED EMBODIMENT

Figure 1:
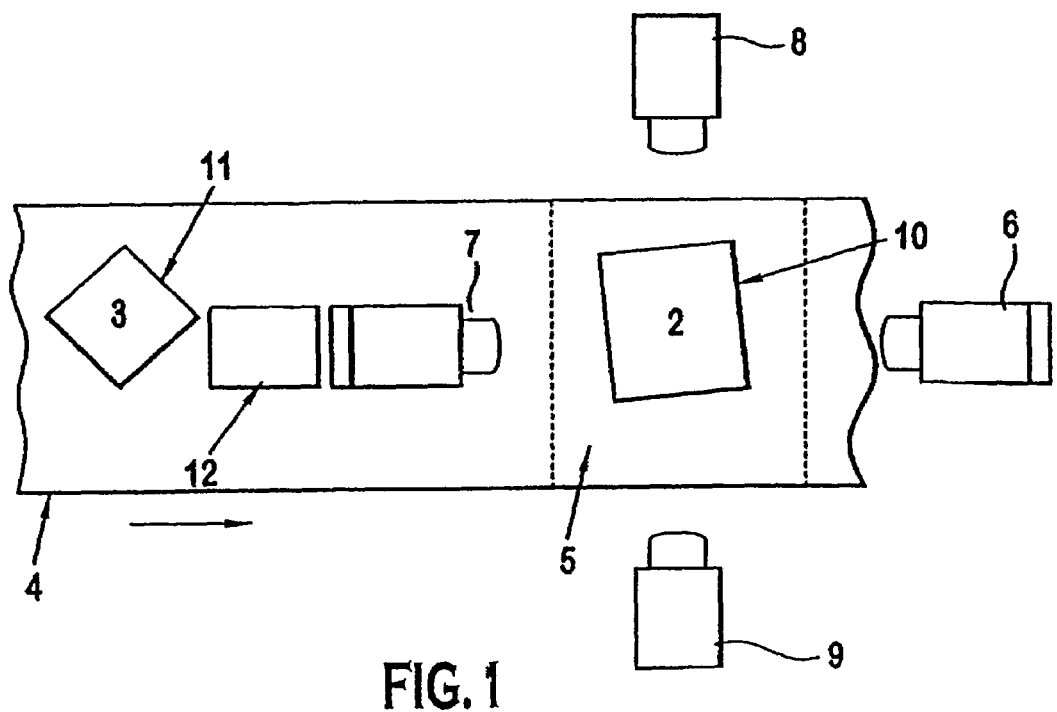
FIG. 1 is a top view of a scanning identification station with objects for scanning being transported along a conveyor surface.

Referring to the drawings, wherein like numerals designate like elements throughout, FIG. 1 shows a top view of an overall scanning system layout where objects 2, 3 to be scanned are transported on a conveyor surface 4 through a scanning zone 5. Preferably, multiple scanners 6–9 monitor the scanning zone 5. Front and back scanners 6, 7 are preferably angled down at the scan surface to scan front, back and top sides. Side scanners are preferably pointed directly at the left and right sides of the scanning zone 5. Coded symbologies on objects passing through the scan area can be scanned by any one of the stationed scanners 6–9 so that symbologies on all sides of the objects can be read. However, a single scanner may be provided, such as for systems where symbologies are only to be read from a single given side of a package passing through the scan area 5.

Preferably, the system is designed to scan boxes with flat rectangular sides such as objects 2, 3, with code symbologies on at least one side, but preferably not the bottom side. However, it is possible to provide a scanner for bottom side scanning. As each object 2, 3 enters the scan zone 5, its corresponding front surface 10 and 11, is frequently not perpendicular to the direction of travel of the conveyor 4. If the front surface plane 10, 11 of an object 2, 3 is less than about 45 degrees from being perpendicular to the direction of travel, the front or back scanner 6, 7 will scan the coded symbologies of the object appearing on the front or back sides. If, for example as shown with object 3, the front surface plane of an object is close to 45 degrees from being perpendicular to the direction of travel, the right or left side scanners 8, 9 will scan the coded symbologies on the front, back, left or right sides of the object and the front and back scanners 6, 7 will scan coded symbologies on the object top side.

A conventional package position sensor system 12 is provided in advance of the symbology scanning area 5. The package position sensor system determines dimensions of the objects 2, 3 and the position and angular orientation of the objects 2, 3 on the conveyor 4. The dimension, position and orientation data of an object 2, 3 is provided from the sensor system 12 to the scanners 6–9 for use in scanning the object 2, 3 in the scanning area 5.

Where the front surface planes 10, 11 of an object 2, 3 are not perpendicular to the direction of travel, the scanning of the coded symbology will not result in a completely focused image of the coded symbologies using conventional optical path focusing.

Figure 2:
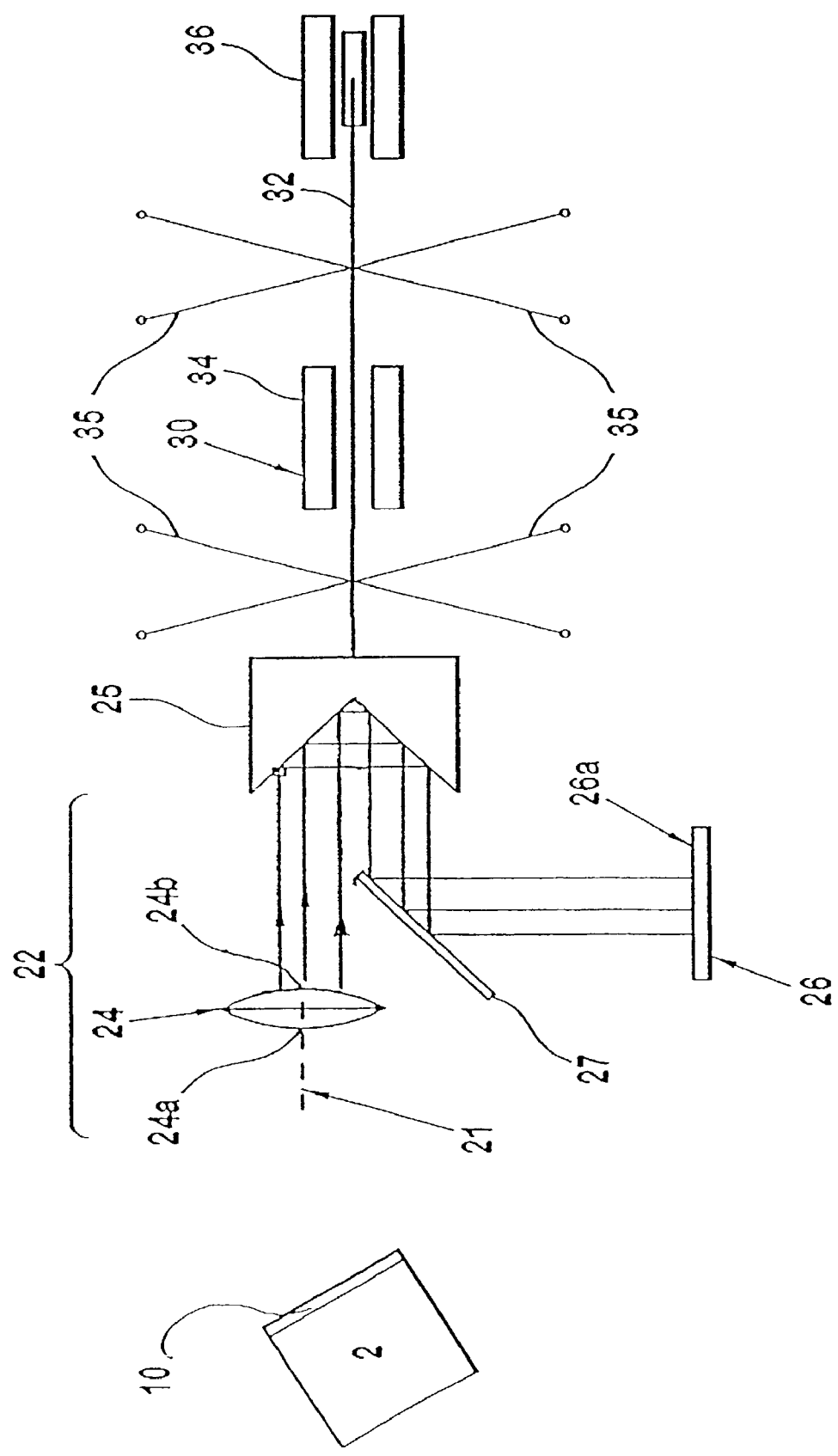
FIG. 2 is a side schematic view of the apparatus according to the teachings of the present invention.

As best seen in FIG. 2, an automatic system for focusing an optical scanning apparatus, such as scanners 6–9, in accordance with the present invention is illustrated. The automatic focusing system includes an image sensor 26 and a lens system 22 having a lens 24 with an object side 24a and an image side 24b. The image sensor is preferably a CCD or CMOS area or linear image sensor.

The lens system 22 is located in a fixed position relative to an optical axis 21 which is orthogonal to the scanner's reference plane. While the lens system 22 is illustrated as including a single objective lens 24, it will be recognized by those skilled in the art that the lens system 22 may include multiple lenses, depending upon the particular application.

One or more mirrors 25, 27 are positioned on the image side 24b of the lens system 22. The mirrors 25, 27 are located such that an image located along the optical axis 21 is reflected by the mirrors to the image sensor 26 as illustrated, for example, in FIG. 2, generally along a path normal to the face 26a of the image sensor.

A linear actuator mechanism 30 is provided to move the mirror 25 backward or forward relative to the lens system 22 to change the optical path distance to the image plane 26a relative to the lens system 22 to focus the image of the object 2. The linear actuator 30 is connected to the mirror 25 via an arm 32 which is controlled by a linear motor 34. In the preferred embodiment, the linear actuator arm 32 is held in place by a suspension system 35. However, those skilled in the art will understand that the linear actuator 30 may be constructed as a solenoid or a stepper motor with a lead screw or using any other suitable controllable displacement means.

A Linear Variable Differential Transformer (LVDT) 36 or an equivalent device provides position feedback for the linear actuator 30 to provide closed loop position control of the focusing mirror 25. When the actuator 30 is actuated, the arm 32 moves the mirror 25 back and forth in line with the optical axis 21 relative to the lens system 22 and the position is sensed by the LVDT 36.

Figure 3:
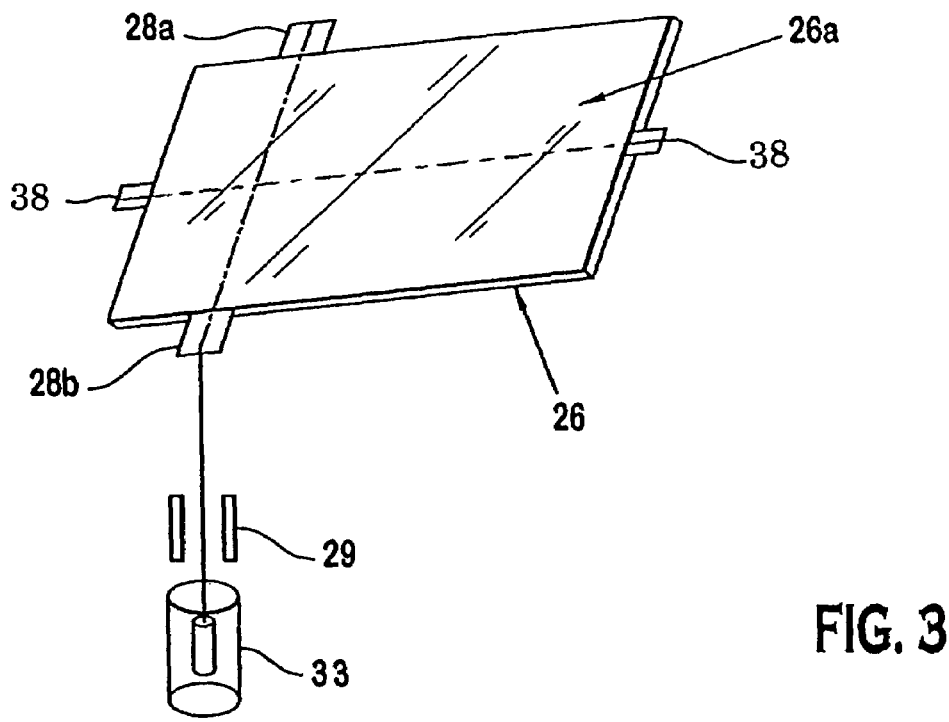
FIG. 3 is a perspective schematic view of a position controlled image sensor for the apparatus of FIG. 2.

Referring to FIG. 3, a supplemental focusing control operative with the image sensor 26 is illustrated. A linear actuator 29 controls the rotation or pitch of the image sensor 26 about a vertical image axis 27. Optionally, two linear actuators 29 are coupled to extending tabs 28a, 28b, one each, respectively, to pivot the sensor surface 26 about the fixed center axis 27 of the sensor 26, the vertical axis of the images corresponding to the center axis 27 of the sensor 26. Each actuator 29 preferably includes a LVDT 33 or an equivalent device to provide precise position feedback data. Where two actuators 29 are provided, the actuators are preferably operated in tandem to provide equal and opposite movement on respective tabs 28a, 28b for providing precise positioning of the sensor surface 26a.

When scanning a skewed surface 10 of an object 2, the mirror linear actuator 30 adjusts the distance of the mirror 25 along the optical axis 21 until a particular portion of object 10, preferably proximate center axis 27, is in focus on the image sensor surface 26a. The sensor linear actuator 29 rotates the image sensor plane 26a along the center fixed axis 27 by pushing or pulling pivot tabs 28b to match the skew of the object 2. Accordingly, the plane of the object surface 10 as observed through the lens system 22 image sensor 26 becomes in focus on the entire sensor surface 26a. Such complete focus occurs by utilizing the supplemental focusing control to position the sensor plane 26a in an orientation which is skewed to correspond to the skew of the object surface 10 from respective planes orthogonal with the optical axis at opposing ends of the optical image path.

The control of the actuators is in a conventional manner primarily based on data generated by the package position sensor system 12, with the LVDTs or equivalent devices providing feedback for closed loop positioning.

Figure 4:
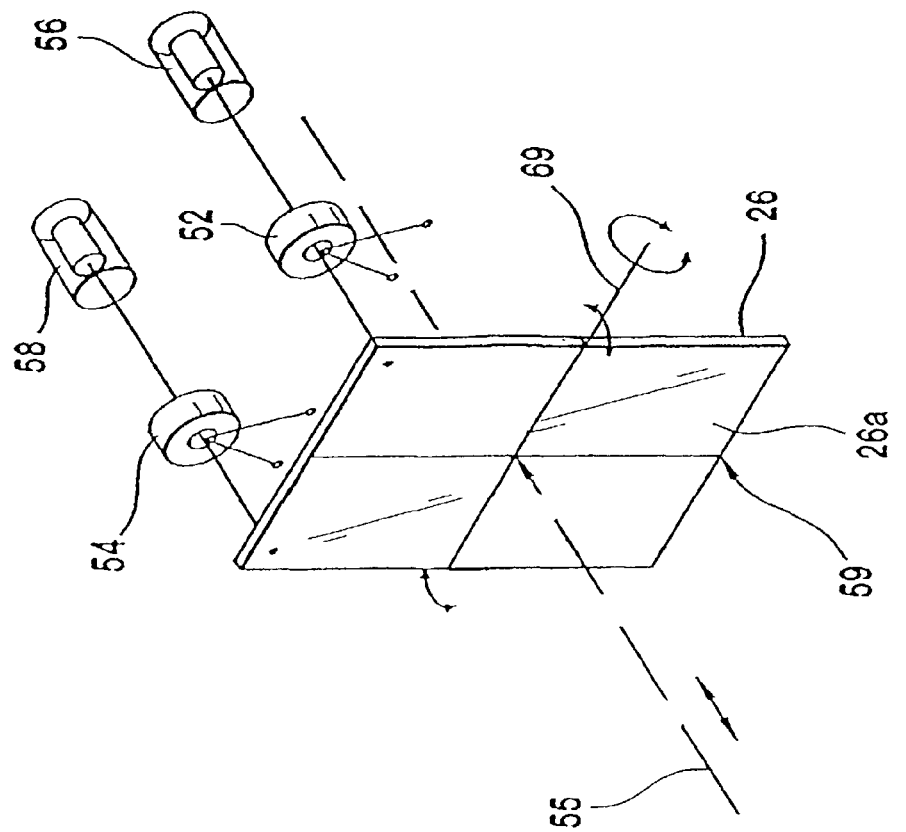
FIG. 4 is a perspective schematic view of an alternate embodiment of a position controlled image sensor for the apparatus.

Referring to FIG. 4, a second embodiment of the supplemental automatic focusing control is shown. In this embodiment, the image sensor 26 is mounted for rotational movement about two axes 59, 69. This provides for image adjustment for both horizontal and vertical axis image skewing of a scan image.

In the alternate embodiment of FIG. 4, the image sensor 26 is coupled to two separate linear actuators 52, 54 for movement and rotation of the image sensor 26. Both linear actuators 52, 54 include an associated LVDT 56, 58 or an equivalent device for generating position feedback data. The LVDTs 56, 58 may be positioned on either side of their associated actuators 52, 54. The first linear actuator 54 is coupled to the top left corner of the image sensor 26 and the second linear actuator 52 is connected to the top right corner of the image sensor 26. Preferably, both linear actuators 52, 54 operate together to move the image sensor 26 about the two axes 59, 69; operating in the same direction for horizontal axis 69 rotation of the sensor surface 26a and in different directions for vertical axis 59 rotation.

In operation, a reflected image from the surface 10 of an object 2 travels through the lens system 22 along an optical path as generally indicated by 55 in FIG. 4. Where an area image sensor is used, the length of the optical path is increased or shortened via a mirror system as discussed above in connection with FIG. 2 to focus the image in the center of the sensor surface 26a. The movable mirror system is not necessary where a linear image sensor is used as discussed below in connection with FIG. 5.

Vertical axis skewing is adjusted for by displacing actuators 52, 54 in opposite directions to tilt the sensor surface 26a along the vertical axis 59. Horizontal axis image skewing is adjusted for by controlling the actuators 52, 54 in tandem to pivot the sensor surface 26a about horizontal axis 69. The LVDTs associated with both the mirror actuator and the sensor actuators provide feedback data to assure precise focusing of the image on sensor surface 26a.

Figure 5:
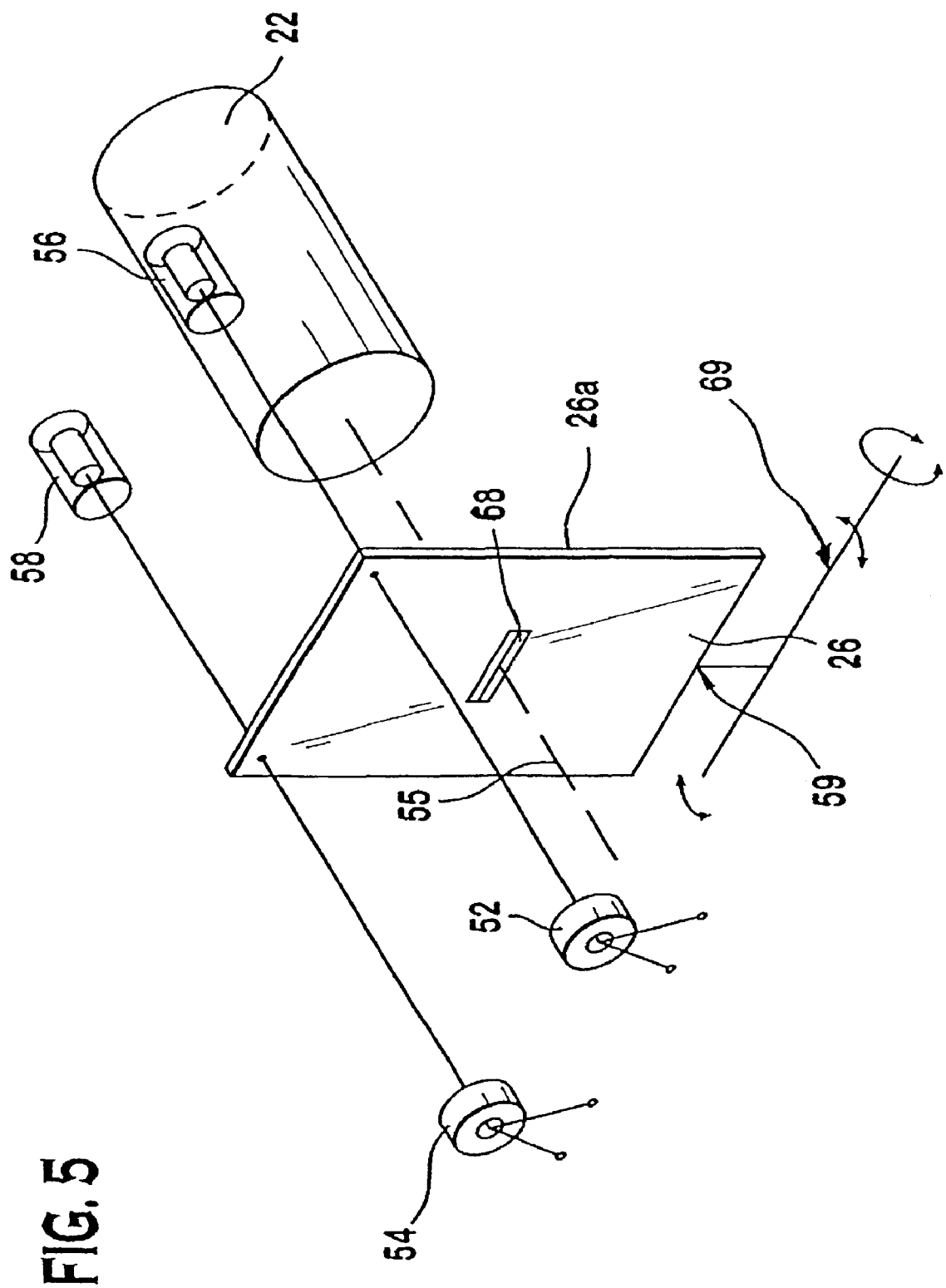
FIG. 5 is a perspective schematic view of an alternate embodiment of a position controlled image sensor for the apparatus.

With reference to FIG. 5, there is shown an additional embodiment of the supplemental automatic focusing control, similar to the embodiment depicted in FIG. 4, but specifically directed to the use of a linear image sensor. As with the embodiment depicted in FIG. 4, two linear actuators 52, 54 are provided with associated LVDTs 56, 58 for operationally displacing the sensor surface 26a along a vertically oriented axis 59 and a horizontally oriented axis 69. The sensor 26 is configured with a centrally located linear image sensor 68 through which the optical axis passes. Where a linear image sensor is used, it is not necessary to incorporate a moveable mirror in the optical path 55, since the optical path length focusing can be accomplished through the pivoting about the horizontal axis 69.

In operation, the sensor surface 26a is displaced via the actuators 52, and 54 as discussed above in connection with FIG. 4. The optical path 55 is lengthened and shortened by operation of the actuators 52, 54 in the same direction.

While the embodiments of the invention have been described in detail, the invention is not limited to the specific embodiments described above which should be considered as merely exemplary. Further modifications and extensions of the present invention may be developed, and all such modifications are deemed to be within the scope and spirit of the present invention as defined by the appended claims and all legal equivalents thereto.

What is claimed is:

1. An optical scanning apparatus for scanning a surface of an object comprising:
   a conveyor for transporting an object into a scanning zone;
   an image sensor having a sensor plane and an image data output;
   an optics system defining an optical path having an axis and a first end whereat the object surface is locatable in the scanning zone for scanning and a second end at said sensor plane;
   an object position sensor that provides skew information of an object traveling on the conveyor; and
   at least one linear actuator operatively coupled to the image sensor to pivot the image sensor plane along a vertical image axis and a horizontal image axis to control the orientation of the image sensor plane relative to the optical path axis such that when an object surface is located at the first end of the optical path at an orientation skewed from a plane orthogonal with the optical path axis at said first path end, the at least one linear actuator orients the sensor plane to a corresponding skewed orientation relative to a plane orthogonal with the optical path axis at said second path end.

2. The apparatus of claim 1 wherein the at least one linear actuator is coupled to a position feedback mechanism which outputs data to assist in the control of the at least one linear actuator.

3. The apparatus of claim 1 wherein the at least one linear actuator comprises a first and a second linear actuator coupled to said image sensor for working cooperatively to pivot the image sensor plane along the vertical image axis and the horizontal image axis.

4. The apparatus of claim 3 wherein one of the pivot axes of the image sensor plane is a central axis of the image sensor plane and the optical path is configured such that said optical path axis passes through said central axis.

5. The apparatus of claim 4 wherein the linear actuators are coupled to respective position feedback mechanisms which output data to assist in the control of the linear actuators.

6. The apparatus of claim 4 wherein the image sensor is a CCD or CMOS area sensor.

7. The apparatus of claim 4 wherein the image sensor is a CCD or CMOS linear image sensor.

8. An apparatus according to claim 1 wherein the optics system comprises:
   a lens subsystem;
   at least one movable mirror for adjusting the length of the optical path; and
   a mirror linear actuator coupled to the movable mirror such that movement of the mirror adjusts the focus of an optical image on the image sensor.

9. The apparatus of claim 8 wherein at least one of the at least one linear actuator and the mirror linear actuator are coupled to position feedback mechanisms which output data to assist in the control of the linear actuators.

10. The apparatus of claim 8 wherein the image sensor is a CCD or CMOS area sensor.

11. The apparatus of claim 8 wherein the image sensor is a CCD or CMOS linear image sensor.

12. The apparatus of claim 8 wherein the at least one linear actuator comprises a first and a second linear actuator coupled to said image sensor for working cooperatively to pivot the image sensor plane along the vertical image axis and the horizontal image axis.

13. The apparatus of claim 12 wherein one of the pivot axes of the image sensor plane is a central axis of the image sensor plane and the optical path is configured such that said optical path axis passes through said central axis.

14. The apparatus of claim 13 wherein the at least one linear actuator and the mirror linear actuator are coupled to respective position feedback mechanisms which output data to assist in the control of the linear actuators.

15. The apparatus of claim 13 wherein the image sensor is a CCD or CMOS area sensor.

* * * * *

UNITED STATES PATENT AND TRADEMARK OFFICE
CERTIFICATE OF CORRECTION

PATENT NO.       : 7,026,606 B2                                    Page 1 of 1
APPLICATION NO.  : 10/276573
DATED            : April 11, 2006
INVENTOR(S)      : Kurt Hecht et al.

It is certified that error appears in the above-identified patent and that said Letters Patent is hereby corrected as shown below:

In the specification:
In column 3, line 49, please delete the reference number "27" and replace with --38--.
In column 3, line 52, please delete the reference number "27" and replace with --38--.
In column 3, line 53, please delete the reference number "27" and replace with --38--.
In column 3, line 63, please delete the reference number "27" and replace with --38--.
In column 3, line 66, please delete the reference number "27" and replace with --38--.

Signed and Sealed this

First Day of July, 2008

JON W. DUDAS
*Director of the United States Patent and Trademark Office*